United States Patent Office 3,454,740
Patented July 8, 1969

3,454,740
PROCESS AND DEVICE FOR WELDING
BY ELECTRON BOMBARDMENT
Henri Foulquier, La Celle-Saint-Cloud, René Roudier, Sucy-en-Brie, and Paul Thome, Saint-Cloud, France, assignors to Commissariat à l'Energie Atomique, Paris, France
Filed Apr. 6, 1967, Ser. No. 629,018
Claims priority, application France, Apr. 15, 1966, 57,796
Int. Cl. B23k 9/00
U.S. Cl. 219—121          1 Claim

ABSTRACT OF THE DISCLOSURE

An electron bombardment welding process performed within a vacuum-tight enclosure in which the parts to be welded form at least one wall of the enclosure and in which the line of junction between the parts to be welded is rendered leak-tight by imprisoning a vacuum seal between two mating surfaces of said parts which make a predetermined angle with the two mating surfaces which form the welding seam, the seal being intended to remain imprisoned after completion of the weld.

The device for the execution of the process comprises a casing which supports the electron gun and which is secured in leak-tight manner to at least one of the parts to be welded so as to delimit with said parts, with the imprisoned seal and with sealing members a vacuum enclosure in which the electron gun is capable of displacement along the welding seam.

---

The present invention relates to a process and a device for welding by electron bombardment, in particular in the case in which the parts to be welded are too massive to be wholly contained within a vacuum chamber.

Among the different processes which are commonly used for welding large parts are electric arc welding, resistance welding and gas welding. However, although these processes prove satisfactory in the majority of applications, there are none the less some instances in which the execution of a weld is governed by particularly exacting conditions which can be satisfied only by having recourse to the process known as electron bombardment.

The operations involved in electron bombardment welding are performed in a vacuum and accordingly make it possible to obtain welds which are free from contamination, which are particularly sound and which provide outstanding weld penetration, depending on the regulated power of the electron beam (ratio of the power of the sighting beam to the cross-sectional area of the electron beam). For example, it is a well known fact that, using power outputs of the order of several kilowatts, a thickness of steel of nearly 20 millimeters can be readily welded in a single pass with a weld bead not exceeding 2 millimeters in width.

By virtue of the concentration of energy which it is possible to obtain by means of this process, the quantity of heat delivered per unit length of the weld bead is maintained at a minimum value, with the result that deformations and shrinkages caused by welding are incomparably smaller than with conventional arc welding processes. Moreover, the shapes of the high-penetration weld seams make it possible to dispense with special machining of chamfered edges on parts to be welded, to reduce the number of welding passes required and consequently to reduce the number of testing and successive cleaning operations which are necessary in the case of the other processes.

However, the practical execution of the process under consideration is limited in practice by the fact that the parts and the electron gun must be placed in evacuated enclosures through which mechanical displacements, optical viewing and like operations must be performed, thereby entailing capital investment which is correspondingly higher as the parts to be welded are more massive. In the case of high weld penetrations and when an additional vacuum is not produced around the electron gun, the metallic vapors and gases evolved from the weld pool modify the value of the vacuum between those portions of the gun which are subjected to different potentials. This gives rise either to convective or corona discharges, and in any case to variations in high-voltage current and consequently to modifications in the performances of the electron gun which may even result in a continuous discharge between the cathode and anode structures, thus preventing any further operation. These disturbances are correspondingly more intense if the vacuum which exists prior to welding is of a low order or if the joint line formed by the two portions to be welded (which constitute an enclosure) is not leak-tight.

The aim of this invention is to overcome the disadvantages referred to above by means of a rapid and simple operation which consists in producing a vacuum within the parts to be assembled, only in that portion of said parts in which a weld is to be made.

In accordance with the invention, the process is characterized in that, after having previously machined the parts to be welded in such a manner that said parts each have at least two contact surfaces, a vacuum seal is clamped against one of said surfaces, a leak-tight enclosure is formed above the point of junction of said parts which are welded by electron bombardment along a line of separation corresponding to the second contact surfaces, a welding gun being displaced within said enclosure along said line and the seal being intended to remain imprisoned after completion of the weld.

The invention is also directed to a welding device in accordance with said process, said device being characterized in that it comprises an electron gun carried by a shielded arm containing the complete assembly of supply and cooling pipes, a casing in which said gun in supported, leak-tight means for securing said casing to at least one of the parts to be welded, a vacuum seal imprisoned between the parts to be welded and applied against two contact surfaces other than those which form the welding seam, an opening whereby the leak-tight enclosure thus formed by said support and said parts is connected to a vacuum system and members for providing a leak-tight passage for the arm of the electron gun through the support and for guiding the displacement of said electron gun along the welding seam.

The means for driving the gun in rotational motion and in translational motion are constituted by operating handles or hand-wheels.

Visual inspection means are constituted by an endoscope or a camera carried by said arm.

Further advantages and properties of the invention will become apparent from the following description and from the accompanying drawings, in which.

As shown in FIGS. 3 to 10, two parts 1 and 10 to be joined by welding have been previously machined in such a manner as to present a plurality of contact faces which make predetermined angles with each other. On the parts 1 and 10 of FIGS. 3, 4, 8 and 10, for example, there have been machined three contact faces 31, 32, 33, two faces 31 and 33 being parallel whilst the third face is at right angles to the two others.

Figure 5:
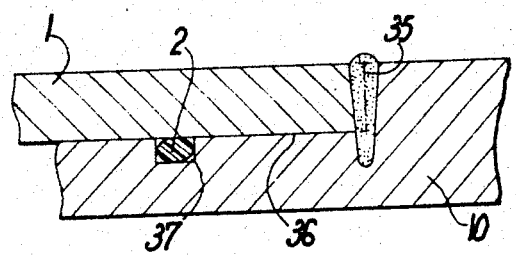
Figure 6:
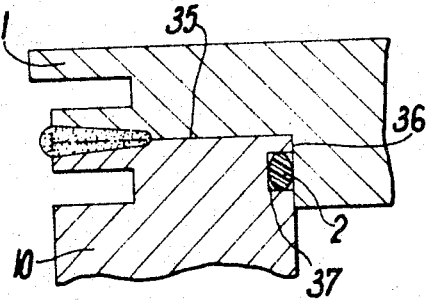
Figure 7:
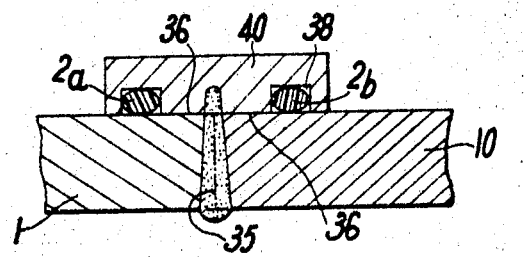
Figure 9:
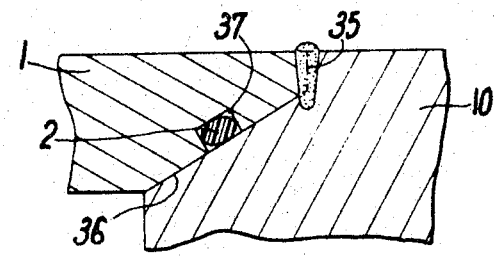

On the contrary, the parts 1 and 10 of FIGS. 5, 6, 7 and 9 have only two surfaces 35, 36 which are inclined to each other at a relatively great angle, a right angle in the case of FIGS. 5, 6 and 7 and an obtuse angle in the case of FIG. 9.

Figure 3:
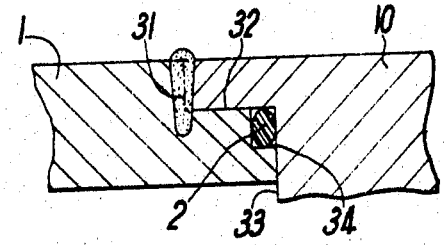
FIGS. 3 to 10 illustrate examples of execution of welds according to the process of the invention.
Figure 8:
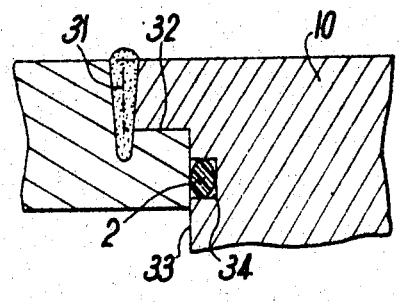

The surface 33 of one of the parts, namely the part 1 in FIG. 3 or the part 10 in FIG. 8, is provided with a channel 34 for the purpose of accommodating a vacuum seal which is clamped between said channel and the second part 10 or 1 to be welded.

The assembly which is obtained by interengagement of the contact surfaces and the clamping of said seal 2 is thus strictly vacuum-tight.

A welding enclosure can then be mounted in a leak-tight manner around the junction thus formed and bears on the parts themselves. The vacuum which is established within said enclosure will remain total throughout the welding operation and will not be modified by any interfering electric discharges arising from faulty leak-tightness between the two parts to be welded. The electron gun can then be effectively utilized for the purpose of joining the two parts along their line of separation which corresponds to the surfaces 31, said gun being adapted to move either in rotation or in translation inside the leak-tight enclosure or together with this latter.

When the weld is formed, the seal 2 remains imprisoned between the parts 1 and 10, which does not constitute a disadvantage inasmuch as it can only contribute to the leak-tightness of the assembly.

The shapes of the contact surfaces and of the channel in which the seal 2 is fitted can vary according to the parts to be welded.

Figure 4:
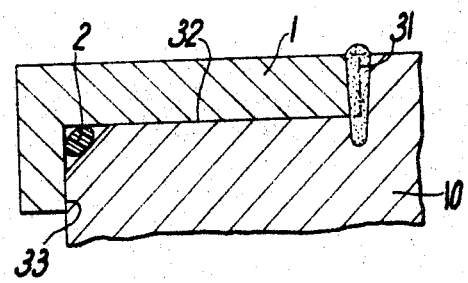
Figure 10:
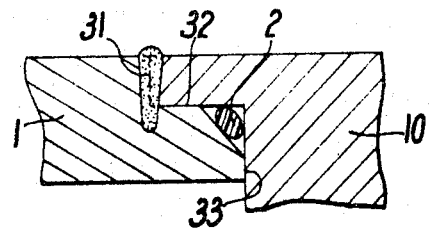

For example, the seal 2 can be clamped between a single chamfer of the part 10 and the part 1 (as shown in FIG. 4) or conversely (as shown in FIG. 10) between a chamfer of the part 1 and the part 10.

In the case in which the parts 1 and 10 have only two contact surfaces 35, 36, one of said surfaces 36 is provided with a channel 37 for holding the seal 2 whilst the other surface 35 forms a welding seam (as shown in FIGS. 5, 6 and 9.

The two contact surfaces can be simply constituted by the end of the part 1 or 10 and one of its lateral walls (as shown in FIG. 7), thereby dispensing with the need of additional machining. The channel 38 in which the seal is fitted is in such a case carried by a member 40 which is applied against the two lateral contact surfaces 36 which are placed in coextensive relation. Said member 40 is in fact provided with two channels 38 each enclosing a seal 2a, 2b which is applied against one of the parts to be welded.

The welding operation is carried out from that face of the parts 1 and 10 which is located opposite to the part 40 and the line of junction of said parts, or welding seam, has the same high degree of leak-tightness as in the embodiments previously described. However, the weld penetrates to the member 40 which is accordingly secured to the two others and can serve, for example, to protect the welding seam. The seals 2a and 2b remain imprisoned between the member 40 and the parts 1 and 10 respectively.

Irrespective of the arrangement and number of contact surfaces, the welding operation is performed by means of an electron gun which is adapted to move within a leak-tight enclosure along the line of separation of the two parts; and the adjacent walls of said two parts form at least one of the sides of said leak-tight enclosure. In some cases, especially when the parts are of tubular shape, such parts may themselves constitute the greater part of the enclosure.

Figure 1:
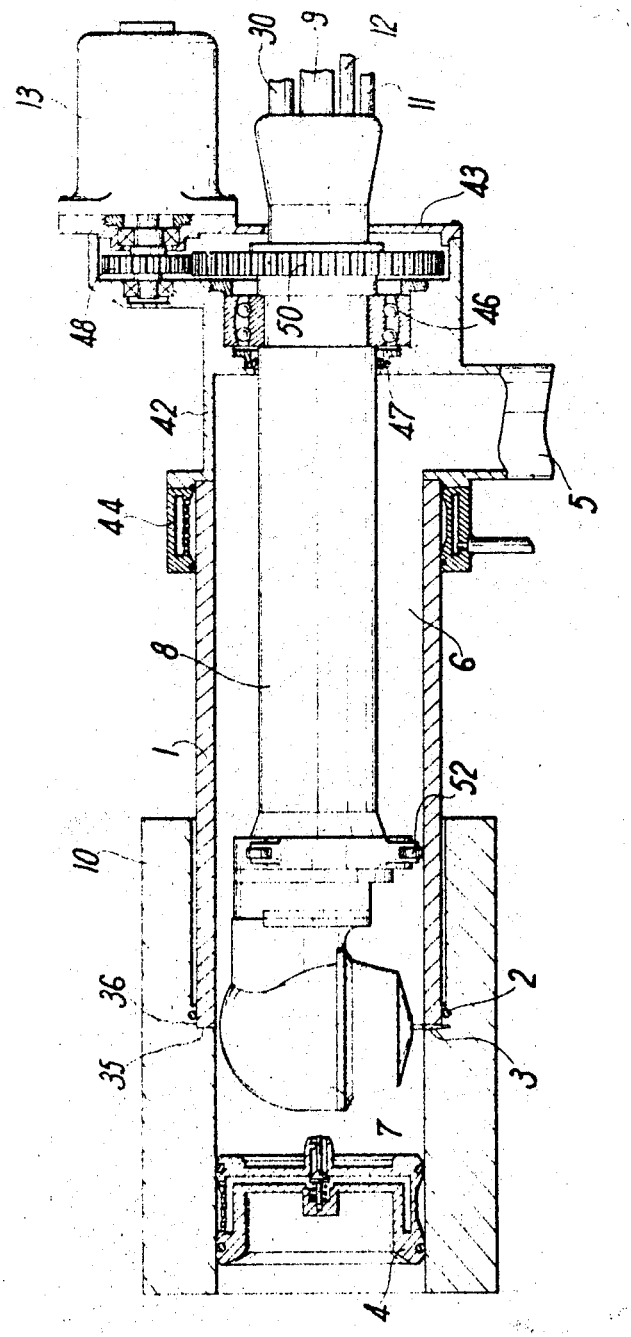
FIG. 1 is a longitudinal sectional view of a device for welding two tubular parts.
Figure 2:
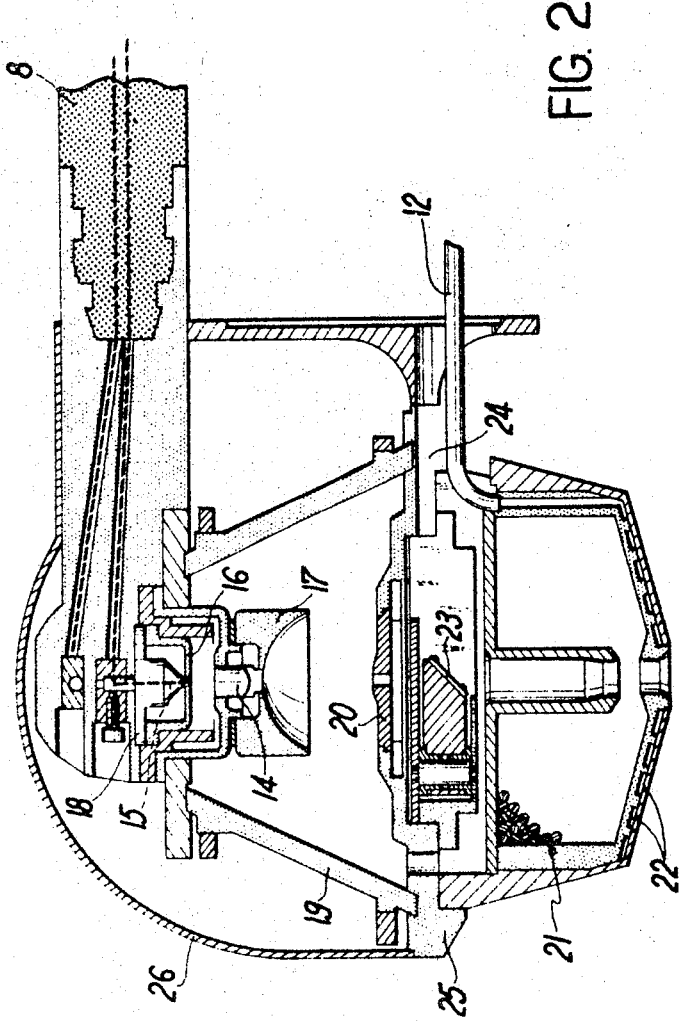
FIG. 2 is a longitudinal sectional view of the electron gun.

One example of welding of tubular parts is shown in FIG. 1, in which a seal 2 is placed between two tubular parts 1 and 10 to be assembled on which two contact surfaces 35, 36 have been machined at right angles to each other, said seal 2 being located at a sufficient distance from the weld 3 to ensure that it is not liable to be destroyed by heating during the welding operation. The imprisoned or "lost" seal 2, the two parts 1 and 10, a removable plug 4, a pumping orifice 5 and a casing 42 which serves to support an electron gun 7 delimit a leak-tight enclosure 6 which can be evacuated and in which the electron gun is adapted to move. Said electron gun, which is completely shielded, is supplied through and supported by an arm 8 which is also shielded and adapted to pass through the support 42.

The casing 42 which serves to support the electron gun 7 and arm 8 has substantially the shape of a cylinder which is open at one extremity, said extremity being secured by any suitable means against one of the tubular parts to be welded such as the part 1, for example, leak-tightness of this assembly being ensured by means of fluid seals 44.

The cylindrical casing 42 is coaxial with the parts 1 and 10 to be welded and the central portion of the end-wall of said casing is adapted to support the arm 8 by means of a system comprising a universal ball bearing 46 and seal 47, said arm being coupled externally of said casing to a motor 13 which produces the displacement of the electron gun 7. Pinions 48–50 which are keyed respectively to the drive shaft of the motor 13 and to the arm 8 serve to transmit, for example, a movement of rotation about the axis of the arm 8 to said electron gun 7.

The removable plug 4 which is locked inside the second part 10 to be welded, on the other side of the welding seam 3, closes the leak-tight chamber which is thus delimited by the casing 42, the parts 1 and 10 which clamp the seal 2, and said plug 4.

The casing 42 is additionally provided with a lateral opening 5 for the purpose of providing a communication with a vacuum system which is not shown in the drawings.

It is also possible in some cases to effect the displacement of the supply arm 8 by wholly manual means (such as an operating handle, for example), whether in rotational or in translational motion; in such a case, the motor 13 is dispensed with.

The arm 8 contains a system 9 for the supply of high-voltage to the electron gun, a low-voltage supply system 30 (coils, lighting elements), an optical system 11 (endoscope, fibers or camera) and a system 12 for the circulation of cooling water.

Said arm 8 is attached to an electron gun 7 comprising a cathode 14, said cathode being heated by electron bombardment from a filament 15 and a diaphragm 16 which emits an electron beam, said beam being shaped by a cathode component 17. This emission system, which is supplied from an insulating high-voltage unit 18 of single-piece construction is supported by a main insulator 19. An anode structure 20 completes the formation of the electron beam which is focused electromagnetically by a coil 21 cooled by a water screen 22. There is placed between the anode 20 and the coil 21 an oblique mirror 23 which reflects the image from the zone to be welded (or welded zone) towards a cavity 24, said cavity being adapted to accommodate either an endoscope or any suitable optical receiving system. This assembly is mounted on a bearing member 25 and is enclosed within a metallic casing or envelope 26 which forms a shield.

By way of example, an electron gun has been constructed in which the maximum spherical dimension along the diameter is 130 mm. and which utilizes a maximum acceleration potential of 35 kilovolts in respect of an electron output of 150 ma.

The penetration of the weld pool is in this case 15 mm.

The positioning of the device and the welding operation are carried out as follows:

The tubular parts 1 and 10 to be welded are interengaged in such a manner that the surfaces 35, 36 which have previously been machined on said parts are brought into contact and the surface 36 imprisons the seal 2 whilst the other surface determines the welding line, or seam. A plug 4 is applied against one of the parts 10 and thus seals off one of the ends of the duct which is formed by said two parts 1 and 10. The electron gun 7 and the arm 8 are then introduced within the enclosure which is formed by said plug 4 and said parts 1 and 10, then adjusted axially, for example by means of packing-pieces (which have not been shown in the drawings). Thus, the extension of the arm 8 is modified in such a manner that the open end of the electron-gun support 42 should bear on the part 1 which does not contain the plug 4, thereby sealing off the enclosure 6 which is thus formed. Powerful pumping action is then applied through the opening 5 of the support 42 until the necessary degree of vacuum is produced for the performance of the welding process. The electron gun 7 is then adjusted for both power and focusing. Welding of the parts 1 and 10 is carried out by producing the displacement of the electron gun by means of the arm 8 and motor 13 which, in the case of FIG. 1, drives the electron gun in rotation about the axis of the parts 1 and 10 and about the axis of the arm 8, whilst a centering roller 52 which is fixed to the arm 8 is adapted, for example, to run over the wall of the part 1. Welding is then performed within an enclosure which is rendered strictly vacuum-tight even along the line of junction of the parts.

As will be readily understood, the invention is not limited in any sense to the form of execution which has been described and illustrated solely by way of example and could accordingly be utilized for the purpose of welding parts of any shape or size.

What we claim is:

1. A process for welding by electron bombardment, the steps of machining the parts to be welded to have at least two displaced contacting surfaces, machining a groove in one of said surfaces, then placing a vacuum seal in said groove against a first contacting surface, generating a vacuum in a region containing the line of separation corresponding to the second of said contacting surfaces, and forming a welded seam by electron beam bombardment in said region at said line of separation, said seal preventing ingress of air to the region of said vacuum and being imprisoned after completion of the weld.

References Cited

UNITED STATES PATENTS

| 2,420,139 | 5/1947 | Kelly | 285—286 X |
| 2,651,329 | 9/1953 | Fowler | 285—286 X |
| 3,136,883 | 6/1964 | Radtke | 219—121 |
| 3,219,792 | 11/1965 | Pederson | 219—117 |
| 3,260,539 | 7/1966 | Herron | 285—287 |
| 3,301,993 | 1/1967 | Boyd et al. | 219—72 X |

JOSEPH V. TRUHE, *Primary Examiner.*

W. DEXTER BROOKS, *Assistant Examiner.*

U.S. Cl. X.R.

219—61